US008580862B2

(12) United States Patent
Barnes et al.

(10) Patent No.: US 8,580,862 B2
(45) Date of Patent: Nov. 12, 2013

(54) CONTINUOUS PROCESS FOR POLYMERIZATION AND EMULSIFICATION OF SILOXANE

(75) Inventors: Kathleen Ann Barnes, Midland, MI (US); David Shawn Tascarella, Midland, MI (US); Dan J. Julian, Bay City, MI (US); Donald Taylor Liles, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/319,509

(22) PCT Filed: Apr. 15, 2010

(86) PCT No.: PCT/US2010/031140
§ 371 (c)(1),
(2), (4) Date: Nov. 8, 2011

(87) PCT Pub. No.: WO2010/132166
PCT Pub. Date: Nov. 18, 2010

(65) Prior Publication Data
US 2012/0053290 A1   Mar. 1, 2012

Related U.S. Application Data

(60) Provisional application No. 61/177,776, filed on May 13, 2009.

(51) Int. Cl.
*B01F 3/08* (2006.01)
*B01J 14/00* (2006.01)
*C08L 83/04* (2006.01)
*C08J 3/05* (2006.01)

(52) U.S. Cl.
USPC .............................. 516/55; 422/131; 524/588

(58) Field of Classification Search
None
See application file for complete search history.

(56) References Cited

U.S. PATENT DOCUMENTS

| 2,823,218 | A | 2/1958 | Speier et al. ................. 556/415 |
| 3,159,601 | A | 12/1964 | Asbby ............................ 528/15 |
| 3,220,972 | A | 11/1965 | Lamoreaux ..................... 528/15 |
| 3,296,291 | A | 1/1967 | Chalk et al. ................... 556/415 |
| 3,419,593 | A | 12/1968 | Willing ........................ 556/479 |

(Continued)

FOREIGN PATENT DOCUMENTS

| CN | 1259534 A | 7/2000 |
| CN | 101080440 A | 11/2007 |

(Continued)

OTHER PUBLICATIONS

International Search Report mailed Jul. 5, 2010 which issued in corresponding International Patent Application No. PCT/US2010/031140 (4 pages).

(Continued)

*Primary Examiner* — Robert S Loewe
(74) *Attorney, Agent, or Firm* — Nixon Peabody LLP

(57) ABSTRACT

A method and apparatus for making silicone-in-water emulsions comprising high viscosity silicone polymers is provided. In various aspects, polyorganosiloxanes are polymerized into high viscosity silicone polymers then emulsified in a continuous process, wherein the process is carried out using a single apparatus. In some aspects, the provided apparatus is an extruder for polymerizing polyorganosiloxanes into high viscosity silicone polymers and then emulsifying such polymers.

22 Claims, 9 Drawing Sheets

(56) References Cited

U.S. PATENT DOCUMENTS

| | | | |
|---|---|---|---|
| 3,516,946 A | 6/1970 | Modic | 502/158 |
| 3,715,334 A | 2/1973 | Karstedt | 528/15 |
| 3,814,730 A | 6/1974 | Karstedt | 528/15 |
| 3,923,705 A | 12/1975 | Smith | 521/117 |
| 3,989,668 A | 11/1976 | Lee et al. | 525/478 |
| 4,128,568 A * | 12/1978 | Buchner et al. | 556/462 |
| 4,250,290 A | 2/1981 | Petersen | 528/14 |
| 4,551,515 A | 11/1985 | Herberg et al. | 528/18 |
| 4,784,879 A | 11/1988 | Lee et al. | 427/213.34 |
| 5,036,117 A | 7/1991 | Chung et al. | 522/172 |
| 5,175,325 A | 12/1992 | Brown et al. | 556/9 |
| 5,354,804 A | 10/1994 | Inada et al. | 524/503 |
| 5,763,505 A | 6/1998 | Derian et al. | 523/322 |
| 5,806,975 A * | 9/1998 | Hosokawa et al. | 366/301 |
| 6,037,407 A * | 3/2000 | Derian et al. | 524/837 |
| 6,184,330 B1 | 2/2001 | Currie et al. | 528/23 |
| 6,214,962 B1 * | 4/2001 | Takahashi et al. | 528/21 |
| 6,221,993 B1 | 4/2001 | Currie et al. | 528/23 |
| 6,232,396 B1 * | 5/2001 | Dong et al. | 524/837 |
| 6,288,196 B1 * | 9/2001 | Takahashi et al. | 528/14 |
| 6,448,196 B1 | 9/2002 | Eglin et al. | 502/167 |
| 6,613,128 B1 | 9/2003 | Simonaru et al. | 95/260 |
| 6,737,444 B1 | 5/2004 | Liu | 524/588 |
| 6,856,059 B2 | 2/2005 | Stewart et al. | 310/89 |
| 2006/0135626 A1 * | 6/2006 | Shim et al. | 516/53 |
| 2006/0241242 A1 | 10/2006 | Devlin et al. | 525/53 |
| 2008/0242744 A1 | 10/2008 | Barnes et al. | 516/55 |
| 2010/0137454 A1 | 6/2010 | Barnes et al. | 424/401 |

FOREIGN PATENT DOCUMENTS

| | | | |
|---|---|---|---|
| CN | 101111534 A | 1/2008 | |
| EP | 0347895 B | 12/1989 | B01J 31/28 |
| EP | 0367445 | 5/1990 | |
| EP | 0568891 | 11/1993 | C08J 3/20 |
| EP | 0716116 | 6/1996 | C08J 3/00 |
| EP | 0982345 | 3/2000 | C08G 77/06 |
| EP | 1189977 | 3/2002 | B29C 47/00 |
| EP | 1392781 | 3/2004 | C08J 3/16 |
| EP | 1447423 | 8/2004 | C08J 3/03 |
| EP | 1733710 | 12/2006 | A61K 8/04 |
| JP | 2000-103857 | 4/2000 | C08G 77/00 |
| WO | WO 00/71609 | 11/2000 | C08J 3/03 |
| WO | WO 02/098994 | 12/2002 | C09D 5/02 |
| WO | WO 2005/016998 | 2/2005 | C08J 3/00 |
| WO | WO 2006/063730 | 6/2006 | A61K 8/06 |
| WO | WO 2006/081978 | 8/2006 | C08G 77/06 |
| WO | WO 2007/067332 | 6/2007 | C09J 183/04 |
| WO | WO 2008/043512 | 4/2008 | |
| WO | WO 2008/045427 | 4/2008 | A61K 8/06 |

OTHER PUBLICATIONS

Written Opinion mailed Jul. 5, 2010 which issued in corresponding International Patent Application No. PCT/US2010/031140 (6 pages).

* cited by examiner

CONTINUOUS PROCESS FOR POLYMERIZATION AND EMULSIFICATION OF SILOXANE

CROSS-REFERENCE TO RELATED APPLICATIONS

This application is the National Stage of International Application No. PCT/US2010/031140, filed Apr. 15, 2010, which claims the benefit of U.S. Provisional Application No. 61/177,776, filed May 13, 2009, each of which is hereby incorporated by reference herein in its entirety.

FIELD

This application relates to a continuous process for making silicone-in-water emulsions, emulsions prepared according to such process, and an apparatus for forming a silicone-in-water emulsions in a continuous process.

BACKGROUND

Silicone-in-water emulsions of high viscosity silicones are easier to handle in certain applications than non-emulsified silicones. Thus, emulsification of such silicones enables their mixing with water-soluble ingredients or other emulsions. Silicone emulsions are well-known in the art and are widely used in coating, household, medical, cosmetic and personal care applications in order to provide, among other things, greater durability, protective qualities, water resistance, and barrier properties.

Silicone-in-water emulsions are typically made by mechanical emulsification, mechanical emulsification by inversion, or emulsion polymerization. Emulsions of low viscosity silicones are typically made by mechanical processes. High viscosity silicone emulsions can also be made by mechanical processes. For example, methods involving mixing surfactants with a silicone gum, adding water to form a water-in-oil emulsion, and applying high shear to cause inversion to an oil-in-water emulsion are known. However, because silicones are highly hydrophobic, because mechanical mixing becomes more difficult as the viscosity of the silicone component increases, and because mechanical mixing of highly viscous components can result in uneven mixing, mechanical processes have generally been found to be unsuitable for making emulsions of high viscosity silicones. Therefore, preparation of silicone-in-water emulsions of high viscosity silicones has for all practical purposes been limited to emulsion polymerization processes.

In a conventional emulsion polymerization process, a siloxane is emulsified before it is polymerized. The process typically occurs in three stages (i) formation of micelle particles and droplets of siloxane (generally polyorganosiloxanes), (ii) diffusion of the siloxane to the micelle particles where polymerization is initiated, and (iii) growth of the polymer until a desired molecular weight is achieved or the siloxane is consumed. The polymerization reaction occurs at the silicone/water interface, where the rate of polymerization is faster with smaller particles because the droplet surface area to droplet volume ratio is higher, which allows for faster transport mechanisms and thus, higher reaction rates. Disadvantages of such conventional processes include, but are not limited to, a limited range of viscosity for the internal phase (for example, high viscosity polymers are particularly problematic), a long batch time (and thus, increased production costs), limited concentration of silicone and formation of undesirable levels of byproducts (for example, cyclosiloxanes).

There have been various attempts to overcome these and other disadvantages. For example, processes have been described involving feeding siloxanes, catalysts for initiating polymerization, surfactant, and water through a series of mixers, extruders, or combinations thereof, wherein polymerization of the siloxanes occurs during or after emulsification. However, while such processes attempt to control viscosity and molecular weight of the silicones, such control is not optimal. Additionally, because such processes generally are not continuous there are inefficiencies due to reliance on various pieces of equipment.

Continuous and quasi-continuous processes for preparing silicone oil-in-water emulsions have been attempted wherein siloxanes undergo polymerization in the presence of a solvent and/or other inert fluid, followed by addition of surfactant, water, and shear for emulsion formation. However, the solvents required by such processes are retained within the silicone polymers and are therefore incorporated in the internal phase (i.e. silicone polymer) of the emulsions.

Reducing the presence of solvents, unreacted siloxanes, catalyst residues, cyclic polymerization byproducts, and other impurities in silicone emulsions is an ongoing challenge in the art. The need to reduce such impurities may arise, among other reasons, when the presence of impurities is incompatible with downstream applications (for example, medical, cosmetic, and personal care applications), where the presence of impurities would reduce the stability of an emulsion, or where regulatory requirements require removal or reduction of their presence. In particular, it is desirable to reduce the presence of cyclosiloxanes, such as octamethylcyclotetrasiloxanes and decamethylcyclopentasiloxanes, in silicone emulsions.

Thus, there remains a need in the art for a continuous process for preparing high viscosity silicone-in-water emulsions, whereby the particle size, viscosity, silicone concentration (i.e. % solids), and molecular weight of the silicone polymer can be optimally controlled, whereby solvents and other impurities (especially cyclosiloxanes) are minimized, and whereby efficiency is achieved through the use of a single apparatus.

SUMMARY

These and other needs in the art are met by the apparatus, silicone-in-water emulsions, and continuous process for making silicone-in-water emulsions provided by embodiments of the present invention. According to various embodiments, provided is a continuous process for making silicone-in-water emulsions in an extruder, comprising (i) forming a high viscosity silicone polymer by polymerization of one or more polyorganosiloxanes; (ii) optionally, neutralizing or stripping the polymer; (iii) cooling the polymer; (iv) optionally, mixing one or more emulsifiers with the polymer; (v) optionally, adding water to the polymer; (vi) applying shear to form a silicone-in-water emulsion; and (vii) optionally, diluting the emulsion; wherein all steps are performed in the extruder. Also provided are silicone-in-water emulsions prepared according to such process. In some aspects, the silicone-in-water emulsions have low levels of at least one of octamethylcyclotetrasiloxanes and decamethylcyclopentasiloxanes. According to other embodiments, provided is an extruder for forming a silicone-in-water emulsion in a continuous process.

These and additional features and advantages of the invention will become apparent in the course of the following detailed description.

BRIEF DESCRIPTION OF DRAWINGS

A more complete appreciation of the invention and the many embodiments thereof will be readily obtained as the same becomes better understood by reference to the following detailed description when considered in connection with the accompanying drawings, wherein.

DESCRIPTION OF EMBODIMENTS

Figure 1:
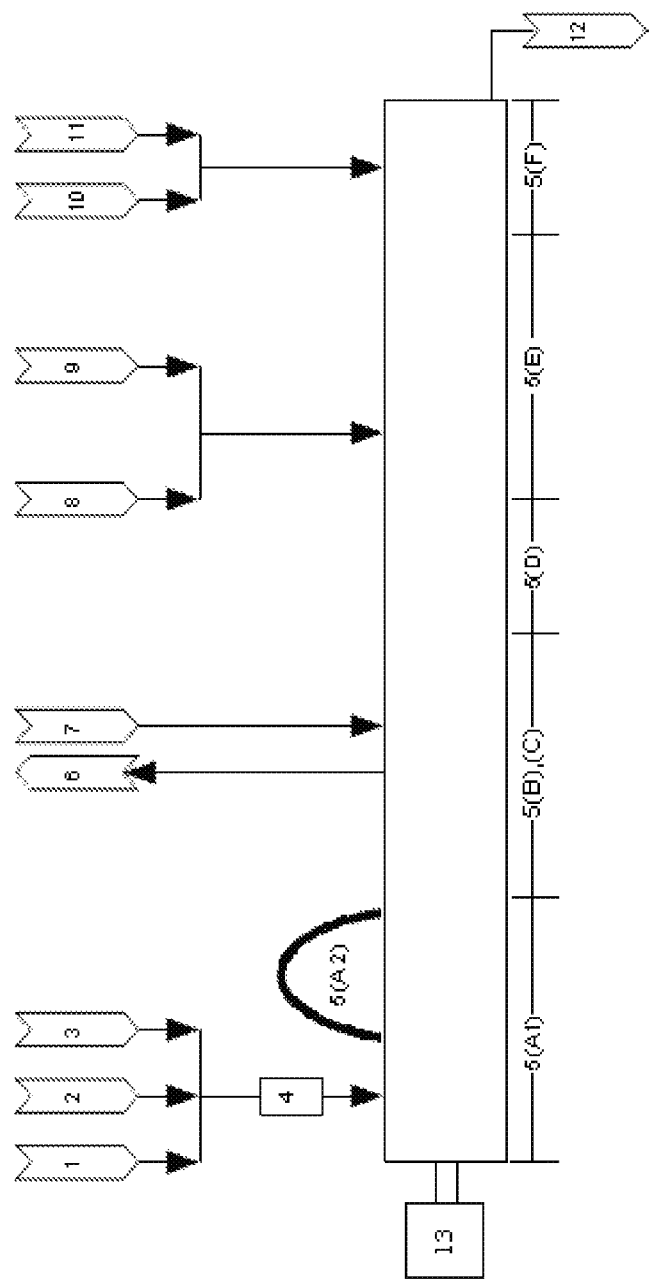
FIGS. 1 and 2 illustrate embodiments of an extruder used for the process described herein.

Features and advantages of the invention will now be described with occasional reference to specific embodiments. However, the invention may be embodied in different forms and should not be construed as limited to the embodiments set forth herein. Rather, these embodiments are provided so that this disclosure will be thorough and complete and will fully convey the scope of the invention to those skilled in the art.

Unless otherwise defined, all technical and scientific terms used herein have the same meaning as commonly understood by one of ordinary skill in the art to which the invention pertains. The terminology used in the description herein is for describing particular embodiments only and is not intended to be limiting.

As used in the specification and appended claims, the singular forms "a," "an," and "the" are intended to include the plural forms as well, unless the context clearly indicates otherwise.

The term "substituted," as used in the specification and appended claims in relation to hydrocarbon groups, means one or more hydrogen atoms in the hydrocarbon group has been replaced with another substituent. Examples of such substituents include, but are not limited to, halogen atoms such as chlorine, fluorine, bromine, and iodine; halogenated organic groups such as chloromethyl, perfluorobutyl, trifluoroethyl, and nonafluorohexyl; oxygen atoms; oxygen-containing groups such as (meth)acrylic and carboxyl; nitrogen atoms; nitrogen atom containing groups such as amines, amino-functional groups, amido-functional groups, and cyano-functional groups; sulfur atoms; and sulfur atom containing groups such as mercapto groups.

As used in the specification and appended claims, the term "particle size" is intended to mean particle size measured using a Malvern Mastersizer S with the 3-SIDD presentation, a 300 RF lens, beam length of 2.40 mm, and an obscuration of between 10 and 20%, and following the manufacturers recommended procedure.

The term "viscosity," as used in the specification and appended claims, is intended to mean viscosity measured using a Brookfield DY-III rheometer with a #52 spindle following the manufacturer's recommended testing procedure and measuring at ambient temperature.

The term "high viscosity silicone polymer," as used in the specification and appended claims, is intended to mean a silicone polymer having a viscosity of at least 10,000 mm$^2$/s at 25° C.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

According to embodiments, provided is a continuous process for making silicone-in-water emulsions having high viscosity silicone polymers and narrow particle sizes (for example, where the ratio of D(v,0.9)/D(v,0.5) is less than 3), wherein the starting materials are linear, substantially linear, and/or cyclic polyorganosiloxanes, and wherein low levels of octamethylcyclotetrasiloxanes, decamethylcyclopentasiloxanes, and/or other impurities are achievable. In some aspects, provided is an apparatus for preparation of high viscosity silicone-in-water emulsions from polyorganosiloxanes in a continuous manner. In other aspects, the apparatus is selected from single-screw extruders and multi-screw extruders.

In contrast to conventional methods, practice of embodiments of the process involves forming the silicone polymer first and then emulsifying to form the desired silicone-in-water emulsion. The silicone polymer is formed by in situ polymerization of polyorganosiloxane starting materials (generally linear, substantially linear, and/or cyclic polyorganosiloxanes). Polymerization is rapid and does not require solvents (other than those required as carriers for the catalysts, optional endblockers, and/or other optional additives known in the art). Thus, low levels of solvents and other impurities (for example, less than 0.3% by weight) in the end product are achievable. Furthermore, the process results in low levels (for example, from about 0-0.3% by weight) of undesired cyclosiloxanes, such as octamethylcyclotetrasiloxanes and decamethylcyclopentasiloxanes, being incorporated into the emulsion. In some aspects, the process allows for versatility in controlling temperature, pressure, and reaction rate, thereby allowing for optimal reaction kinetics as well as emulsification conditions. Furthermore, the process is readily scalable to larger equipment where production rates on commercially available equipment may be high (for example, in excess of 175 times that demonstrated). The agile and flexible nature of the process, combined with the degrees of freedom inherent in the chemistry allow for a wide range of capability in silicone polymer viscosity, emulsifier type, and particle size.

The continuous process described herein comprises, in certain aspects, the steps of: (i) forming a silicone polymer in an extruder by polymerization of one or more siloxanes; wherein polymerization is selected from (A) condensation polymerization of polyorganosiloxanes having reactive hydroxyl groups; (B) ring-opening polymerization of cyclosiloxanes; (C) addition polymerization of polyorganosiloxanes having unsaturated aliphatic groups with hydrogen-terminated polyorganosiloxanes; and (D) combinations thereof; wherein polymerization is carried out in the absence of a solvent (other than any solvents used as carriers for catalysts, optional endblockers, and other optional additives known in the art); (ii) optionally, stripping and/or optionally, neutralizing the silicone polymer; (iii) cooling the neutralized polymer; (iv) optionally, mixing one or more emulsifiers; (v) optionally, adding water; (vi) applying shear to form an emulsion; and (vii) optionally, diluting and/or adding other additives to the emulsion; and wherein all of steps (i)-(vii) are performed using the same extruder.

One step of the process involves polymerization of one or more siloxanes in the reaction zone of an extruder. In certain aspects, the polymerization reaction can be selected from (A) condensation polymerization of linear or substantially linear polyorganosiloxanes having reactive hydroxyl groups; (B) ring-opening polymerization of cyclosiloxanes; (C) addition polymerization of a mixture of polyorganosiloxanes having unsaturated aliphatic groups and hydrogen-terminated polyorganosiloxanes; and (D) combinations thereof.

Condensation Polymerization of Polyorganosiloxanes

Any suitable condensation polymerization reaction pathway (i.e. polymerization of siloxanes with hydroxyl functional groups in the presence of an acid, base, or other catalyst with the elimination of low molecular weight by-products such as water) may be utilized. In certain aspects, the process utilizes as starting materials, linear or substantially linear polyorganosiloxanes having reactive hydroxyl groups. Such polyorganosiloxanes can be generally characterized by formula (1):

$$R^1O[R^2R^3SiO]_xH \quad (1)$$

wherein each R is independently selected from a hydrogen atom, an alkyl or substituted alkyl group containing 1 to 8 carbon atoms, an aryl or substituted aryl group containing 1 to 8 carbon atoms, and wherein x is an integer with a value of at least 2. In certain aspects, x is an integer with a value range of 3-80. In other aspects, x is an integer with a value range of 3-49. In additional aspects, x is an integer with a value range of 50-80. Examples of R include, but are not limited to, methyl, ethyl, propyl, isopropyl, butyl, sec-butyl, iso-butyl, and tert-butyl. Good results have been obtained with polydimethylsiloxanes.

With the presence of various groups in the polymeric chain, the polymer may comprise a modest degree of branching and still be considered "linear" or "substantially linear," as the terms are used herein. In certain aspects, the degree of branching is less than 10%. In other aspects, the degree of branching is less than 2%.

The linear or substantially linear polyorganosiloxane starting materials used for the condensation polymerization steps of the inventive process may have, in certain aspects, a viscosity of from about 40 mm²/s to about 100 mm²/s at 25° C. Good results have been obtained with polyorganosiloxanes having a viscosity of from about 53 mm²/s to about 88 mm²/s at 25° C.

Practice of embodiments of the process involve introducing polyorganosiloxanes into the reaction zone of the extruder (shown as 5A in FIG. 1), where the condensation polymerization reaction proceeds in the absence of solvents (other than any solvents used as carriers for catalysts, optional endblockers, and other additives known in the art). In some aspects, the catalyst is added to and mixed with the polyorganosiloxanes in the extruder. In other aspects, the catalyst is added to and mixed with the polyorganosiloxanes immediately prior to introduction of the mixture into the extruder (for example, via a static mixer attached to the extruder). In either case, polymerization primarily occurs in the reaction zone of the extruder. In some aspects, the reaction zone of the extruder includes an external residence loop to allow for additional reaction time before the siloxane/polymer mixture enters the downstream (with respect to whichever end the drive is located) stripping and neutralization zone.

In principle, any suitable condensation catalyst known in the art may be utilized in the process. In certain aspects, protic acids, Lewis acids and bases, organic acids and bases, and inorganic acids and bases are used. For example, $BF_3$, $FeCl_3$, $AlCl_3$, $ZnCl_2$, and $ZnBr_2$ can be used. Alternatively, organic acids such as those having the general formula $RSO_3H$, wherein R represents an alkyl group having from 6 to 18 carbon atoms (for example, a hexyl or dodecyl group), an aryl group (for example, a phenyl group), or an alkaryl group (for example, dodecylbenzyl) can be used. In certain aspects, dodecylbenzenesulphonic acid (DBSA) is the catalyst used. Other condensation-specific catalysts suitable for the reactive extrusion process include, but are not limited to, n-hexylamine, tetramethylguanidine, carboxylates of rubidium or cesium, hydroxides of potassium, sodium, magnesium, calcium or strontium, and phosphonitrile halide ion-based catalysts having the general formula $[X(PX_2=N)_zPX_3]^+$, wherein X denotes a halogen atom and wherein z is an integer from 1 to 6. In certain aspects, $[PCl_3=N—PCl_2=N—PCl_3]^+ PCl_6$ is the catalyst used.

One of skill in the art will appreciate that condensation polymerization involves the production of water as a by-product. In certain aspects of the invention, it may or may not be necessary to remove the water formed during condensation. In some aspects, removal of water is required and is done during or after the condensation polymerization step but before the optional neutralization step. Methods of removing water are known in the art.

Ring-Opening Polymerization of Cyclosiloxanes

Any suitable ring-opening polymerization reaction pathway may be utilized. In certain aspects, the inventive process utilizes as starting materials cyclosiloxanes. Cyclosiloxanes are polyorganosiloxanes that can be generally characterized by formula (2):

$$[R^1R^2SiO]_x \tag{2}$$

wherein each R is independently selected from a hydrogen atom or an optionally substituted alkyl, alkenyl, aryl, alkaryl, or aralkyl group containing 1 to 8 carbon atoms, wherein x is an integer with a value range of 3-12. For example, the alkyl group can be methyl, ethyl, n-propyl, trifluoropropyl, isopropyl, n-butyl, sec-butyl, iso-butyl, and tert-butyl. The alkenyl group can be, for example, vinyl, allyl, propenyl, and butenyl. For example, the aryl and aralkyl groups can be phenyl, tolyl, and benzoyl. In certain aspects, R is selected from hydrogen atom, methyl, ethyl, phenyl, vinyl, and trifluoropropyl, and x is an integer from 3 to 6. For example, octamethylcyclotetrasiloxane, hexamethylcyclotrisiloxane, decamethylcyclopentasiloxane, cyclopenta(methylvinyl)siloxane, cyclotetra(phenylmethyl)siloxane, and cyclopentamethylhydrosiloxane are suitable cyclic siloxanes for the process.

The cyclosiloxane starting materials of the process may have, in certain aspects, a viscosity of from about 1 mm²/s to about 5 mm²/s at 25° C. Good results have been obtained with cyclosiloxanes having a viscosity of from about 2 mm²/s to about 3 mm²/s at 25° C.

Practice of embodiments of the process involve introducing cyclosiloxanes into the reaction zone of the extruder, where the polymerization reaction proceeds in the absence of solvents (other than any solvents used as carriers for catalysts, optional endblockers, and other additives known in the art). In some aspects, the catalyst is added to and mixed with the cyclosiloxanes in the extruder. In other aspects, the catalyst is added to and mixed with the cyclosiloxanes immediately prior to introduction of the mixture into the extruder (for example, via a static mixer attached to the extruder). In either case, polymerization primarily occurs in the reaction zone of the extruder. In some aspects, the reaction zone of the extruder includes an external residence loop to allow for additional reaction time before the siloxane/polymer mixture enters the downstream stripping and neutralization zone.

In principle, any suitable ring-opening polymerization catalyst may be used in the process. For example, the catalyst can be selected from alkali metal hydroxides such as lithium hydroxide, sodium hydroxide, potassium hydroxide or cesium hydroxide; alkali metal alkoxides or complexes of alkali metal hydroxides and an alcohol; and alkali metal silanolates such as potassium silanolate, cesium silanolate, sodium silanolate and lithium silanolate or trimethylpotassium silanolate. Other catalysts which might be utilized include phosphonitrile halides, phosphazene acids, and phosphazene bases. In certain aspects, polydimethylaminophosphazenium hydroxide is used for the reactive extrusion process.

Addition Polymerization of Polyorganosiloxanes

The polymerization step of the process can be addition polymerization of a mixture of polyorganosiloxanes having unsaturated aliphatic groups and hydrogen-terminated polyorganosiloxanes. In certain aspects, the addition polymerisation pathway is a hydrosilylation reaction wherein Si—H bonds are added across unsaturated bonds (for example, an alkenyl or alkynyl group) in the presence of a suitable catalyst. At least one of the polyorganosiloxanes in the reaction mixture contains one or more unsaturated aliphatic groups capable of undergoing addition type reactions, and at least one of the other polyorganosiloxanes contains one or more Si—H group capable of undergoing addition type reactions. In certain aspects, the polyorganosiloxanes are linear, substantially linear, or branched and can generally be characterized by formula (3):

$$R^1O[R^2R^3SiO]_xR^4 \tag{3}$$

wherein each R is independently selected from a hydrogen atom, an alkyl or substituted alkyl group containing 1 to 8 carbon atoms, an alkenyl or substituted alkenyl group containing 1 to 8 carbon atoms, an alkynyl or substituted alkynyl group containing 1 to 8 carbon atoms, and an aryl or substituted aryl group containing 1 to 8 carbon atoms, wherein x is an integer with a value of at least 2. In some aspects, x is an integer with a value range of 3-1300. In other aspects, x is an integer with a value range of 3-650. In additional aspects, x is an integer with a value range of 651-1300. Examples of R include, but are not limited to, methyl, ethyl, propyl, isopropyl, butyl, sec-butyl, iso-butyl, and tert-butyl, vinyl, propenyl, butenyl, ethynyl, propynyl, and butynyl. In certain aspects, at least one R is an alkenyl, substituted alkenyl, alkynyl, or substituted alkynyl group. In other aspects, at least one R is a hydrogen atom.

With the presence of various groups in the polymeric chain, the polymer may comprise a modest degree of branching and still be considered "linear" or "substantially linear," as the terms are used herein. In certain aspects, branching is less than 10%. In other aspects, branching is less than 2%.

The polyorganosiloxane starting materials used for the addition polymerization steps of the process may have, in certain aspects, a viscosity of from about 8 mm²/S to about 55,000 mm²/s at 25° C. Good results have been obtained with polyorganosiloxanes having a viscosity of from about 8 mm²/s to about 12 mm²/s at 25° C., and with polyorganosiloxanes having a viscosity of from about 25,000 mm²/s to about 52,000 mm²/s at 25° C.

Practice of embodiments of the process involve introducing the polyorganosiloxanes into the reaction zone of the extruder, where the polymerization reaction proceeds in the absence of solvents (other than any solvents used as carriers for catalysts, optional endblockers, and other additives known in the art). In some aspects, the catalyst is added to and mixed with the polyorganosiloxanes in the extruder. In other aspects, the catalyst is added to and mixed with the polyorganosiloxanes immediately prior to introduction of the mixture into the extruder (for example, via a static mixer attached to the extruder). In either case, polymerization primarily occurs in the reaction zone of the extruder. In some aspects, the reaction zone of the extruder includes an external residence loop to allow for additional reaction time before the siloxane/polymer mixture enters the downstream stripping and neutralization zone.

Any suitable addition polymerization catalyst may be used in the inventive process. For example, the catalyst can be selected from any metal-containing catalyst which facilitates the reaction of silicon-bonded hydrogen atoms of the Si—H terminated siloxane monomer with the unsaturated hydrocarbon group on the other siloxane monomer. Such metals are illustrated by ruthenium, rhodium, palladium, osmium, iridium, or platinum. Examples of suitable catalysts include, but are not limited to, chloroplatinic acid; alcohol modified chloroplatinic acids; olefin complexes of chloroplatinic acid; complexes of chloroplatinic acid and divinyltetramethyldisiloxane; fine platinum particles adsorbed on carbon carriers; platinum supported on metal oxide carriers such as $Pt(Al_2O_3)$; platinum black; platinum acetylacetonate; platinum(divinyltetramethyldisiloxane; platinous halides exemplified by $PtCl_2$, $PtCl_4$, $Pt(CN)_2$; complexes of platinous halides with unsaturated compounds exemplified by ethylene, propylene, and organovinylsiloxanes; styrene hexamethyldiplatinum; platinum divinyl tetramethyl disiloxane complex; the reaction product of chloroplatinic acid and an unsaturated aliphatic group-containing organosilicon compound; a neutralized complex of platinous chloride and divinyl tetramethyl disiloxane; ruthenium catalysts such as $RhCl_3$ $(Bu_2S)_3$; and ruthenium carbonyl compounds such as ruthenium 1,1,1-trifluoroacetylacetonate, ruthenium acetylacetonate, triruthinium dodecacarbonyl, or a ruthenium 1,3-ketoenolate.

Suitable platinum catalysts are described in U.S. Pat. No. 2,823,218 (commonly referred to as "Speier's catalyst) and U.S. Pat. No. 3,923,705. The platinum catalyst may be "Karstedt's catalyst", which is described in Karstedt's U.S. Pat. Nos. 3,715,334 and 3,814,730. Karstedt's catalyst is a platinum divinyl tetramethyl disiloxane complex typically containing about one-weight percent of platinum in a solvent such as toluene. Alternatively the platinum catalyst may be a reaction product of chloroplatinic acid and an organosilicon compound containing terminal aliphatic unsaturation, as described in U.S. Pat. No. 3,419,593. Alternatively, the hydrosilyation catalyst is a neutralized complex of platinum chloride and divinyl tetramethyl disiloxane, as described in U.S. Pat. No. 5,175,325.

Other suitable hydrosilylation catalysts include, but are not limited to, rhodium catalysts such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX^4_3[(R^3)_2S]_3$, $(R^2_3P)_2Rh(CO)X^4$, $(R^2_3P)_2Rh(CO)H$, $Rh_2X^4_2Y^4_4$, $H_aRh_bolefin_cCl_d$, $Rh(O(CO)R^3)_{3-n}(OH)_n$ where $X^4$ is hydrogen, chlorine, bromine or iodine, $Y^4$ is an alkyl group, such as methyl or ethyl, CO, $C_8H_{14}$ or 0.5 $C_8H_{12}$, $R^3$ is an alkyl radical, cycloalkyl radical or aryl radical and $R^2$ is an alkyl radical an aryl radical or an oxygen substituted radical, a is 0 or 1, b is 1 or 2, c is a whole number from 1 to 4 inclusive and d is 2, 3 or 4, n is 0 or 1. Any suitable iridium catalyst, such as $Ir(OOCCH_3)_3$, $Ir(C_5H_7O_2)_3$, $[Ir(Z^2)(En)_2]_2$, or $(Ir(Z^2)(Dien)]_2$, where $Z^2$ is chlorine, bromine, iodine, or alkoxy, En is an olefin and Dien is cyclooctadiene may also be used. Further suitable hydrosilylation catalysts are described in, for example, U.S. Pat. Nos. 3,159,601; 3,220,972; 3,296,291; 3,516,946; 3,989,668; 4,784,879; 5,036,117; and 5,175,325 and EP 0 347 895 B.

Combination of Reactions

The polymerization step of the process can also be a combination of polymerization reactions selected from condensation polymerization of polyorganosiloxanes having reactive hydroxyl groups; ring-opening polymerization of cyclosiloxanes; and addition polymerization of a mixture of polyorganosiloxanes having unsaturated aliphatic groups and hydrogen-terminated polyorganosiloxanes.

Practice of embodiments of the process wherein a combination of polymerization reactions is utilized involves combining the siloxane starting materials described above, combining the catalysts described above, and following the methods of introducing starting materials into the apparatus as is described above.

Regardless of whether a condensation reaction, ring-opening reaction, addition polymerization reaction, or a combination thereof is chosen for the initial steps of the process, the result is that high viscosity silicone polymers are formed in the reaction zone of the extruder. In certain aspects, the silicone polymers formed have a viscosity of from about 10,000 $mm^2/s$ to about 200,000,000 $mm^2/s$ at 25° C. For example, good results have been obtained by condensation polymerization of linear or substantially linear polyorganosiloxanes, wherein the silicone polymer formed has a viscosity of from about 80,000 $mm^2/s$ to about 10,000,000 $mm^2/s$ at 25° C. Additionally, good results have been obtained by addition polymerization of polyorganosiloxanes, wherein the silicone polymer formed has a viscosity of from about 1,200,000 $mm^2/s$ to about 170,000,000 $mm^2/s$ at 25° C.

In addition to the nature of the polymerization reaction chosen (i.e. condensation, ring-opening, addition, or a combination thereof), the amount of catalyst used depends upon, among other things, the siloxane starting materials and the desired silicone polymer. Typically the amount of catalyst present is from about 2 ppm to about 208 ppm (by weight, based on weight of the siloxane), including but not limited to, about 2-12 ppm, about 12-24 ppm, about 24-36 ppm, about 36-48 ppm, about 48-60 ppm, about 60-72 ppm, about 72-84 ppm, about 84-96 ppm, about 96-108 ppm, about 108-120 ppm, about 120-136 ppm, about 136-148 ppm, about 148-160 ppm, about 160-172 ppm, about 172-184 ppm, about 184-196 ppm, and about 196-208 ppm. In some aspects, the catalyst is present in amount of from about 3 ppm to about 53 ppm, including but not limited to about 3-13 ppm, about 13-23 ppm, about 23-33 ppm, about 33-43 ppm, and about 43-53 ppm. In additional aspects, the catalyst is present in a solvent in an amount from about 1-50% (w/w).

When desired, any suitable end-blocking agent known in the art (for example, water, polymethyl siloxanes, or silanes having one group capable of reacting with the terminal groups of the polymer) can also be added to the reaction zone to introduce the appropriate end-groups in the polymer and halt the polymerization reaction, thereby limiting the average molecular weight of the resulting silicone polymer. The end-blocking agent is present in an amount calculated to result in the desired molecular weight range of silicone polymer. In certain aspects, the end-blocking agent is added to and mixed with the siloxane(s) in the extruder. In some aspects, the end-blocking agent is added to and mixed with the siloxane(s) immediately prior to introduction of the mixture into the extruder.

Additionally, when desired, any conventional additive known for use in production of silicone polymer can also be added to the reaction zone. The additive is present in an amount calculated to result in the desired properties of the silicone polymer. In some aspects, the additive is added to and mixed with the siloxane(s) in the extruder. In other aspects, the additive is added to and mixed with the siloxane(s) immediately prior to introduction of the mixture into the extruder.

The reaction zone of the extruder may allow for control of reaction temperature of the siloxane/polymer mixture, as well as pressure and the throughput rate/residence time of the siloxane/polymer mixture in the reaction zone. The catalyst(s) chosen, desired reaction products and their properties, and optional end-blocking agent and other optional additive may affect how temperature, pressure, and residence time are chosen. In some aspects, the reaction zone (or portions thereof) may be maintained at a temperature of from about 0° C. to about 200° C., including but not limited to from about 0° C.-10° C., about 10° C.-20° C., about 20° C.-30° C., about 30° C.-40° C., about 40° C.-50° C., about 50° C.-60° C., about 60° C.-70° C., about 70° C.-80° C., about 80° C.-90° C., about 90° C.-100° C., about 100° C.-110° C., about 110° C.-120° C., about 120° C.-130° C., about 130° C.-140° C., about 140° C.-150° C., about 150° C.-160° C., about 160° C.-170° C., about 170° C.-180° C., about 180° C.-190° C., about 190° C.-200° C. In other aspects, the reaction zone is maintained at a temperature of from about 15° C.-135° C., including but not limited to, 15° C.-30° C., about 30° C.-45° C., about 45° C.-60° C., about 60° C.-75° C., about 75° C.-90° C., about 90° C.-105° C., about 105° C.-120° C., and about 120° C.-135° C. In additional aspects, the reaction zone is maintained at a temperature of from about 120° C.-180° C., including but not limited to, 120° C.-130° C., about 130° C.-140° C., about 140° C.-150° C., about 150° C.-160° C., about 160° C.-170° C., and about 170° C.-180° C.

In some aspects, the reaction zone (or portions thereof) may be maintained at a pressure of from about 3000 Pa to about 102,000 Pa, including but not limited to, from about 3000-6000 Pa, about 6000-12000 Pa, about 12000-18,000 Pa, about 18,000-24,000 Pa, about 24,000-30,000 Pa, about 30,000-36,000 Pa, about 36,000-42,000 Pa, about 42,000-48,000 Pa, about 48,000-54,000 Pa, about 54,000-60,000 Pa, about 60,000-66,000 Pa, about 66,000-72,000 Pa, about 72,000-78,000 Pa, about 78,000-84,000 Pa, about 84,000-90,000 Pa, about 90,000-96,000 Pa, and about 96,000-102,000 Pa. In other aspects, the pressure is from about 3400 Pa to about 35,400 Pa, including but not limited to, from about 3400-5400 Pa, about 5400-7400 Pa, about 7400-9400 Pa, about 9400-11,400 Pa, about 11,400-13,400 Pa, about 13,400-15,400 Pa, about 15,400-17,400 Pa, about 17,400-19,400 Pa, about 19,400-21,400 Pa, about 21,400-23,400 Pa, about 23,400-25,400 Pa, about 25,400-27,400 Pa, about 27,400-29,400 Pa, about 29,400-31,400 Pa, about 31,400-33,400 Pa, and about 33,400-35,400 Pa.

According to embodiments, the residence time in the reaction zone (including any time in an optional external residence loop) may be from about 3 seconds to about 32 minutes, including but not limited to from about 3-15 seconds, about 15-30 seconds, about 30-45 seconds, about 45-60 seconds, about 60-75 seconds, about 75-90 seconds, about 90-105 seconds, about 105-120 seconds, about 2-5 minutes, about 5-8 minutes, about 8-11 minutes, about 11-14 minutes, about 14-17 minutes, about 17-20 minutes, about 20-23 minutes, about 23-26 minutes, about 26-29 minutes, about 29-32 minutes, and portions thereof.

After sufficient reaction time, the silicone polymer formed enters the downstream stripping and neutralization zone of the extruder. In some embodiments, neutralization takes place prior to stripping. In other embodiments, neutralization takes place after stripping. In further embodiments, only stripping takes place. In alternative embodiments, only neutralization takes place. In additional embodiments, neither stripping nor neutralization take place.

If a neutralizing agent is used, any neutralizer suitable for the catalyst chosen can be used. Suitable neutralizing agents for acid type condensation catalysts include, but are not limited to, amine bases such as mono, di, and tri-alkanolamines (for example, monoethanolamine and triethanolamine). In some aspects, trihexylamine is a suitable neutralizing agent. Suitable neutralizing agents for phosphazene-based condensation catalysts include, but are not limited to, phosphazene inhibitors and deactivators such as triisononylamine, n-butyl-lithium, lithium siloxanolate, hexamethylcyclotrisilazane, hexamethyldisilazane, and magnesium oxide. Suitable neutralizing agents for ring-opening polymerization catalysts include, but are not limited to, acids such as acetic acid, silyl phosphate, polyacrylic acid chlorine substituted silanes, or silyl phosphonate. In some aspects, trimethylsilylvinylphosphonic acid is a suitable neutralizing agent for ring-opening polymerization catalysts. In some aspects, the neutralization agent is present in a solvent in an amount from about 1-50% (w/w).

Catalyst residues, unreacted siloxanes, and other products (for example, cyclosiloxanes, solvents, and water) can remain in the polymer product, be removed by stripping in the stripping and neutralization zone, or be removed by alternative means after exiting the extruder. Stripping can generally be performed by heating the stripping and neutralization zone (or portion thereof) from about 20° C. to about 250° C., including but not limited to, from about 20° C.-30° C., about 30° C.-40° C., about 40° C.-50° C., about 50° C.-60° C., about 60° C.-70° C., about 70° C.-80° C., about 80° C.-90° C., about 90° C.-100° C., about 100° C.-110° C., about 110° C.-120° C., about 120° C.-130° C., about 130° C.-140° C., about 140° C.-150° C., about 150° C.-160° C., about 160° C.-170° C., about 170° C.-180° C., about 180° C.-190° C., about 190° C.-200° C., about 200° C.-210° C., about 210° C.-220° C., about 220° C.-230° C., about 230° C.-240° C., and about 240° C.-250° C. In certain aspects, stripping may be performed at temperatures from about 130° C. to about 180° C., including but not limited to, from about 130° C.-135° C., about 135° C.-140° C., about 140° C.-145° C., about 145° C.-150° C., about 150° C.-155° C., about 155° C.-160° C., about 160° C.-165° C., about 165° C.-170° C., about 170° C.-175° C., and about 175° C.-180° C. In some aspects, stripping is performed under a reduced pressure of from about 3000-53,000 Pa, including but not limited to, from about 3000-5000 Pa, about 5000-7000 Pa, about 7000-9000 Pa, about 9000-11,000 Pa, about 11,000-13,000 Pa, about 13,000-15,000 Pa, about 15,000-17,000 Pa, about 17,000-19,000 Pa, about 19,000-21,000 Pa, about 21,000-23,000 Pa, about 23,000-25,000 Pa, about 25,000-27,000 Pa, about 27,000-29,000 Pa, about 29,000-31,000 Pa, about 33,000-35,000 Pa, about 35,000-37,000 Pa, about 37,000-39,000 Pa, about 39,000-41,000 Pa, about 43,000-45,000 Pa, about 45,000-47,000 Pa, about 47,000-49,000 Pa, about 49,000-51,000 Pa, and about 51,000-53,000 Pa. The materials removed during stripping can be condensed and collected.

After sufficient stripping and/or neutralization, the silicone polymer enters the cooling zone of the extruder where the polymer is cooled. In some aspects, the cooling zone (or portions thereof) can be maintained at a temperature of from about 0° C. to about 60° C., including but not limited to from about 0° C.-10° C., about 10° C.-20° C., about 20° C.-30° C., about 30° C.-40° C., about 40° C.-50° C., and about 50° C.-60° C.

Optionally, after cooling, one or more additional polymers may be mixed with the cooled silicone polymer. Such additional polymers may be selected from silicone or non-silicone polymers. In certain aspects, a polysiloxane selected from hydroxyl-functional, trimethyl-functional, vinyl-functional, hydrogen-functional, and amino-functional polysiloxanes may be mixed with the cooled silicone polymer.

After sufficient cooling (and optional mixing with additional polymers), the resultant silicone polymer enters the emulsification zone of the extruder where shear is imparted by rotating screw(s) and emulsifier and/or water are optionally added. In some aspects, the screw(s) may rotate at a speed of from about 100-1500 revolutions/minute (RPM), including but not limited to, from about 100-300 RPM, about 300-500 RPM, about 500-700 RPM, about 700-900 RPM, about 900-1100 RPM, about 1100-1300 RPM, and about 1300-1500 RPM. In certain aspects, the screw(s) rotate at a speed of from about 400 RPM to about 800 RPM, including but not limited to, from about 400-450 RPM, about 450-500 RPM, about 500-550 RPM, about 550-600 RPM, about 600-650 RPM, about 650-700 RPM, about 700-750 RPM, and about 750-800 RPM. In additional aspects, the water generated from the polymerization reaction is sufficient to cause emulsification and inversion when shear is applied, and thus neither emulsifier nor water needs to be added. In other aspects, one or more emulsifiers, and optionally additional water, are needed in order for an emulsion to form.

As used herein, "emulsifier" refers to any compound or substance that enables the formation of an emulsion. The emulsion may be an oil/water emulsion, a water/oil emulsion, a multiple phase or triple emulsion. The emulsifier may be selected from any surface active compound or polymer capable of stabilizing emulsions. Typically, such surface active compounds or polymers stabilize emulsions by preventing coalescence of the dispersed particles. The surface active compounds useful as emulsifiers in the present process may be a surfactant or combination of surfactants. In principle, the surfactant used can be any surfactant known for emulsification of silicones and can be cationic, anionic, non-ionic, and/or amphoteric. However, surfactant choice will depend upon, among other things, siloxanes chosen, catalyst used, silicone polymer formed during polymerization, and emulsion properties desired. Mixtures of surfactants of different types and/or different surfactants of the same type can be used. The surfactant can be added to the emulsification zone in undiluted form or mixed with water and then added to the emulsification zone. Where more than one surfactant is used, the surfactants can be premixed, added simultaneously, or can be added successively to the emulsification zone.

Examples of cationic surfactants include, but are not limited to, quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide as well as corresponding salts of these materials, fatty amines and fatty acid amides and their derivatives, basic pyridinium compounds, and quaternary ammonium bases of benzimidazolines and poly(ethoxylated/propoxylated) amines.

Examples of anionic surfactants include, but are not limited to, alkyl sulphates such as lauryl sulphate, polymers such as acrylates/$C_{10-30}$ alkyl acrylate crosspolymer alkylbenzenesulfonic acids and salts such as hexylbenzenesulfonic acid, octylbenzenesulfonic acid, decylbenzenesulfonic acid, dodecylbenzenesulfonic acid, cetylbenzenesulfonic acid and myristylbenzenesulfonic acid; the sulphate esters of monoalkyl polyoxyethylene ethers; alkylnapthylsulfonic acid; alkali metal sulfoccinates, sulfonated glyceryl esters of fatty acids such as sulfonated monoglycerides of coconut oil acids, salts of sulfonated monovalent alcohol esters, amides of amino sulfonic acids, sulfonated products of fatty acid nitriles, sulfonated aromatic hydrocarbons, condensation products of naphthalene sulfonic acids with formaldehyde, sodium octahydroanthracene sulfonate, alkali metal alkyl sulphates, ester sulphates, and alkarylsulfonates. Anionic surfactants include alkali metal soaps of higher fatty acids, alkylaryl sulfonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates.

Examples of non-ionic surfactants include, but are not limited to, condensates of ethylene oxide with long chain fatty alcohols or fatty acids such as a C12-C16 alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, polyoxyalkylene alkyl ethers such as polyethylene glycol long chain alkyl ether, polyoxyalkylene sorbitan ethers, polyoxyalkylene alkoxylate esters, polyoxyalkylene alkylphenol ethers, ethylene glycol propylene glycol copolymers and alkylpolysaccharides, polymeric surfactants such as polyvinyl alcohol (PVA) and polyvinylmethylether. In certain aspects, the surfactant is a polyoxyethylene fatty alcohol or mixture of polyoxyethylene fatty alcohols. In other aspects, the surfactant is an aqueous dispersion of a polyoxyethylene fatty alcohol or mixture of polyoxyethylene fatty alcohols.

Examples of amphoteric surfactants include cocamidopropyl betaine, cocamidopropyl hydroxysulfate, cocobetaine, sodium cocoamidoacetate, cocodimethyl betaine, N-coco-3-aminobutyric acid and imidazolinium carboxyl compounds.

The surfactant can be aqueous, non-aqueous, and/or in diluted or undiluted form. Thus, the surfactant chosen, its aqueous/non-aqueous nature, its diluted/undiluted form, and the desired properties of the emulsion will dictate whether or not additional water is added in order to form the emulsion. In certain aspects, addition of surfactant alone is sufficient for emulsification. In other aspects, it is necessary to add both surfactant and water. In additional aspects, the catalyst chosen (for example, dodecylbenzylsulfonic acid) can have surfactant properties and be involved in emulsification. Similarly, in some aspects, the surfactant chosen (for example benzenesulfonic acids and quaternary ammonium salts) can have catalytic activity for polymerization.

The amount of surfactant added to the emulsification zone of the extruder may generally be from about 0.1% (by weight based on the siloxane monomer) to about 20.1%, including but not limited to from about 0.1%-1.1%, about 1.1%-2.1%, about 2.1%-3.1%, about 3.1%-4.1%, about 4.1%-5.1%, about 5.1%-6.1%, about 6.1%-7.1%, about 7.1%-8.1%, about 8.1%-9.1%, about 9.1%-10.1%, about 10.1%-11.1%, about 11.1%-12.1%, about 12.1%-13.1%, about 13.1%-14.1%, about 14.1%-15.1%, about 15.1%-16.1%, about 16.1%-17.1%, about 17.1%-18.1%, about 18.1%-19.1%, and about 19.1%-20.1%.

The amount of water present (for emulsification and/or inversion purposes), including any water present in the surfactant composition, may generally be from about 0.5% (by weight based on the siloxane monomer) to about 30.5%, including but not limited to from about 0.5%-1.5%, about 1.5%-2.5%, about 2.5%-3.5%, about 3.5%-4.5%, about 4.5%-5.5%, about 5.5%-6.5%, 6.5%-7.5%, about 7.5%-8.5%, about 8.5%-9.5%, about 9.5%-10.5%, about 10.5%-11.5%, about 11.5%-12.5%, about 12.5%-13.5%, about 13.5%-14.5%, about 14.5%-15.5%, about 15.5%-16.5%, about 16.5%-17.5%, about 17.5%-18.5%, about 18.5%-19.5%, about 19.5%-20.5%, about 20.5%-21.5%, about 21.5%-22.5%, about 22.5%-23.5%, about 23.5%-24.5%, about 24.5%-25.5%, about 25.5%-26.5%, about 26.5%-27.5%, about 27.5%-28.5%, about 28.5%-29.5%, and about 29.5%-30.5%.

In alternative embodiments, the emulsifier may be a polymer or those materials considered in the art as "thickeners" or "thickening agents." Such polymeric emulsifiers include, but are not limited to, polyvinyl alcohol, cellulosic polymers or xanthan gums. The polyvinyl alcohol includes hydrolyzed polyvinyl alcohols, such as 80-95% hydrolyzed polyvinyl alcohol. Suitable thickening agents are exemplified by sodium alginate, gum arabic, polyoxyethylene, guar gum, hydroxypropyl guar gum, ethoxylated alcohols, such as laureth-4 or polyethylene glycol 400, cellulose derivatives exemplified by carboxy methylcellulose, methylcellulose, methylhydroxypropylcellulose, hydroxypropylcellulose, polypropylhydroxyethylcellulose, starch, and starch derivatives exemplified by hydroxyethylamylose and starch amylose, locust bean gum, electrolytes exemplified by sodium chloride and ammonium chloride, and saccharides such as fructose and glucose, and derivatives of saccharides such as PEG-120 methyl glucose diolate or mixtures of 2 or more of these. Typically the thickening agent is selected from the group consisting of cellulose derivatives, saccharide derivatives, and electrolytes, or from a combination of two or more of the above thickening agents exemplified by a combination of a cellulose derivative and any electrolyte, and a starch derivative and any electrolyte.

In the emulsification zone of the extruder shear is applied to cause the silicone continuous phase of the oil and water dispersion to undergo inversion to become the dispersed phase. Thus, the limited amount of water that is either formed during polymerization or is added to the silicone oil phase in a stepwise fashion undergoes inversion to become the continuous phase, and a silicone-in-water emulsion is formed. The quantity of water and/or emulsifier may have an impact on the particle size of the final emulsion. In certain aspects, the emulsions formed may have an average particle size of from about 0.1 µm to about 25 µm [D(v, 0.5)]. For example, emulsions with an average particle size of from about 0.2 µm to about 0.6 µm [D(v, 0.5)], about 0.32 µm to about 0.55 µm [D(v, 0.5)], about 0.35 µm to about 0.85 µm [D(v, 0.5)], and about 0.3 µm to about 20 µm [D(v, 0.5)] have been obtained.

Whereas emulsions are typically 30-60% solids, the process described herein allows for emulsions having a wide range of percent solids. For example, as the process allows for emulsions with up to 95% solids. Percent solids is a calculated value based on the weight percent of non-volatile components in the total formulation. The calculation can be confirmed by placing a known weight of material into an oven and heated for some amount of time to drive off any volatiles and then re-weighing the material and calculating the difference in weight.

Thus, in certain aspects, the emulsions produced by the process have a wide range of silicone polymer viscosities and molecular weights, particle sizes, and percent solids. In additional aspects, the emulsions have low levels of: solvents, unreacted siloxanes, octamethylcyclotetrasiloxanes, decamethylcyclopentasiloxanes, and/or other impurities.

After the desired emulsion has formed, and the desired particle size has been reached, additional water may optionally be added to the dilution zone of the extruder in a subsequent dilution step to achieve the preferred solids content. Other additives known in the art may also be added at this stage. For example, additives such as preservatives, thickeners, and/or stabilizers may be added.

In addition to a process for making silicone-in-water emulsions, also provided is an apparatus suitable for performing the process, wherein high viscosity silicone-in-water emulsions are formed from polyorganosiloxanes in a continuous process. According to embodiments, the apparatus is selected from single-screw extruders and multi-screw extruders. In some aspects, materials are moved through the extruder by one or more screws having elements selected from forward pitch elements, reverse pitch elements, and combinations thereof. In certain aspects, materials are moved through the extruder by one or more screws having primarily (i.e. greater than 50% by length) forward pitch elements, and in other aspects, materials are moved through the extruder by one or more screws having primarily (i.e. greater than 50% by length) reverse pitch elements. In further aspects, materials are either moved through the extruder in a forward direction (i.e. moving away from the drive end of the extruder) or are moved through the extruder in a reverse direction (i.e. moving towards the drive end of the extruder).

Figure 2:
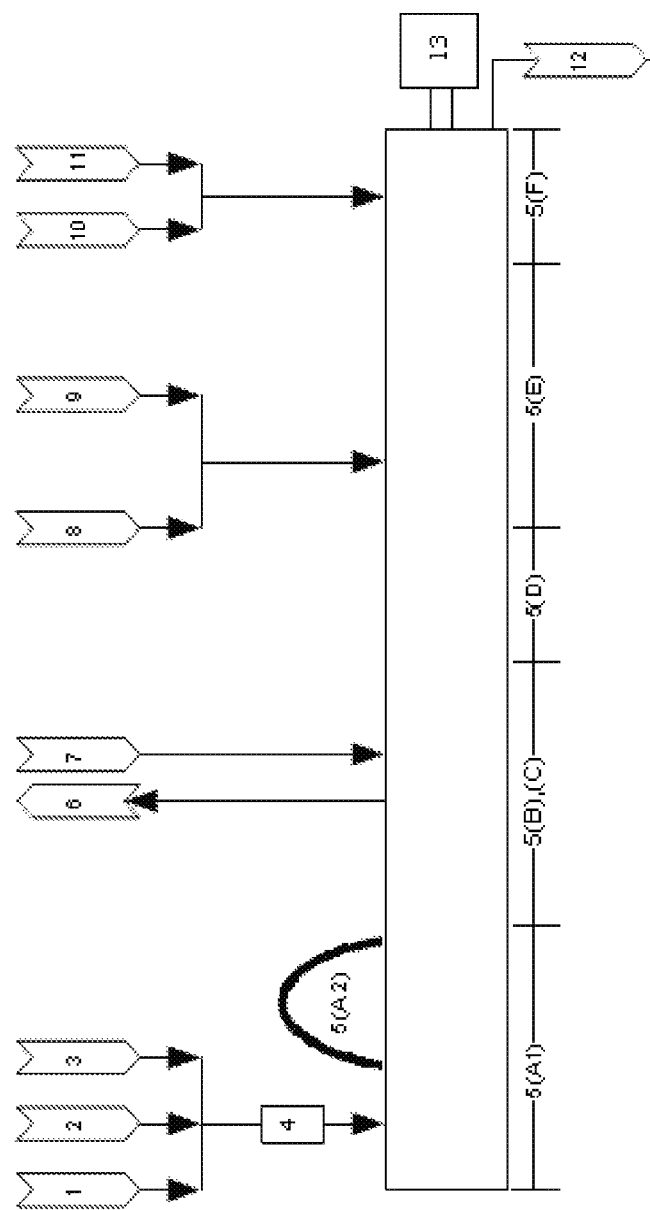

FIGS. 1 and 2 describe extruders useful for the process described herein. Connected to a twin screw extruder 5 are feed lines for continuously feeding polyorganosiloxane starting materials 1, catalyst 2, and optional additives 3 (for example, end blocker or other conventional additives used in production of silicone polymer) respectfully through an optional static mixer 4 and then into the extruder reaction zone 5A, where a polymerization reaction occurs under controlled temperature and pressure. If additional reaction time is desired, an external residence loop 5A2 may be utilized. The external residence loop is created by utilizing a screw design that diverts fluid out of the extruder, through an external length of pipe of sufficient volume to create the desired residence time, and back into the extruder at a downstream location. The external residence loop may also be temperature controlled or fitted with insulation. According to embodiments, the reaction zone 5A comprises from about 5% to about 80% of the total length of the extruder.

The silicone polymer produced by the polymerization reaction moves from the reaction zone 5A to the downstream stripping and neutralization zone 5B, C of the extruder, where optional stripping can occur by subjecting the polymer to heat and/or reduced pressure whereby reaction byproducts 6 (for example, volatile siloxanes, unreacted cyclosiloxanes, or water) are removed from the silicone polymer. The removed materials may be condensed and collected. An optional neutralizing agent 7 can be fed continuously into the extruder to stop the reaction mechanism. If added, the neutralizing agent can be added either before or after optional stripping. According to embodiments, the stripping and neutralization zone 5B, C comprises from about 5% to about 75% of the total length of the extruder.

The stripped and/or neutralized silicone polymer moves from the stripping and neutralization zone 5B, C to the downstream cooling zone 5D of the extruder, where the polymer is cooled prior to moving to the downstream emulsification zone 5E of the extruder, where one or more emulsifier(s) 8 and/or water 9 are optionally fed continuously into the extruder and emulsification takes place due to the shear imparted by the rotating screw(s) (not shown). According to embodiments, the cooling zone 5D comprises from about 5% to about 25% of the total length of the extruder, and the emulsification zone 5E comprises from about 5% to about 50% of the total length of the extruder.

Once the desired emulsion is formed, it may optionally move from the emulsification zone 5E to the downstream dilution zone 5F of the extruder, where additional water 10 and/or other additives 11 are optionally fed into the extruder. Finally, the emulsified silicone polymer is removed from the extruder through line 12. According to embodiments, the optional dilution zone 5F comprises from about 5% to about 25% of the total length of the extruder.

According to further aspects, the drive 13 can be located at either end of the extruder such that in operation, materials are either driven away from the drive 13 or materials are driven toward the drive 13.

Figure 3:
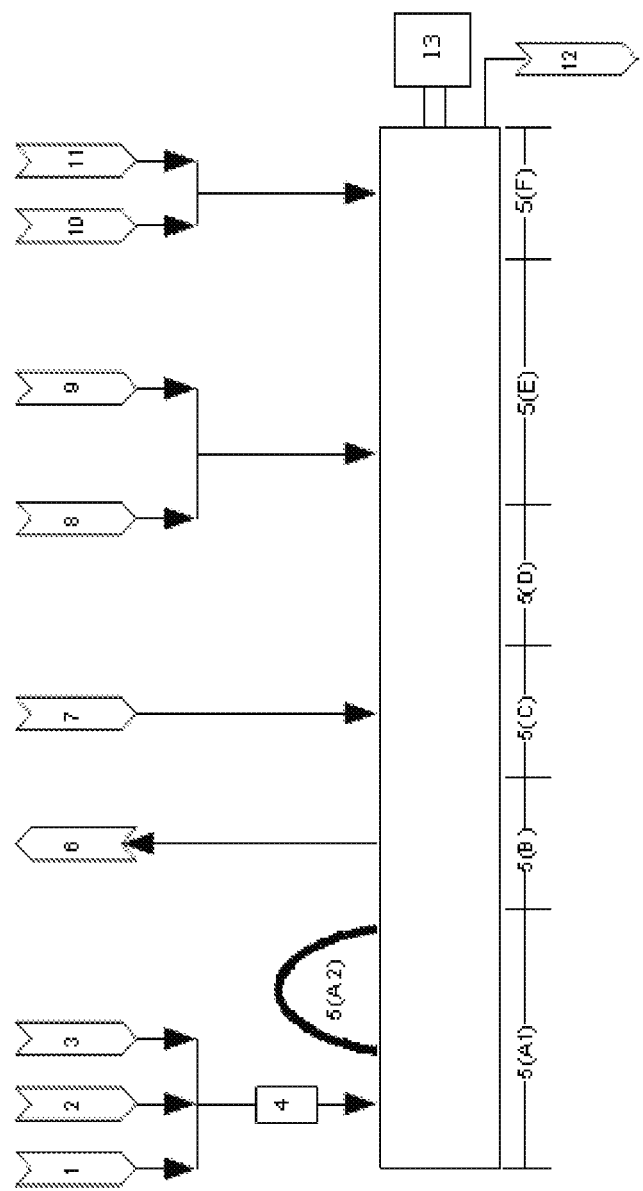
FIG. 3 illustrates an additional embodiment of an extruder used for the process described herein, wherein the stripping zone 5B precedes the neutralization zone 5C.

FIG. 3 also describes an extruder useful for the process. Connected to a twin screw extruder 5 are feed lines for continuously feeding starting materials 1 (polyorganosiloxanes), catalyst 2, and optional additives 3 (for example, end blocker or other conventional additives used in production of silicone polymer) respectfully through an optional static mixer 4 and then into the extruder reaction zone 5A, where a polymerization reaction occurs under controlled temperature and pressure.

The silicone polymer produced by the polymerization reaction moves from the reaction zone 5A to the downstream stripping zone 5B of the extruder, where stripping can occur by subjecting the polymer to heat and/or reduced pressure whereby reaction byproducts 6 (for example, volatile siloxanes, unreacted cyclosiloxanes, or water) are removed from the silicone polymer. The removed materials may be condensed and collected. According to embodiments, the stripping zone 5B comprises from about 5% to about 50% of the total length of the extruder.

The stripped silicone polymer moves from the stripping zone 5B to the downstream neutralization zone 5C of the extruder, where a neutralizing agent 7 is fed continuously into the extruder to stop the reaction mechanism. According to embodiments, the neutralization zone 5C comprises from about 5% to about 25% of the total length of the extruder.

The neutralized silicone polymer moves from the neutralization zone 5C to the downstream cooling zone 5D of the extruder, where the polymer is cooled prior to moving to the downstream emulsification zone 5E of the extruder, where one or more emulsifier(s) 8 and/or water 9 are optionally fed continuously into the extruder and emulsification takes place due to the shear imparted by the rotating screws (not shown).

Once the desired emulsion is formed, it may optionally move from the emulsification zone 5E to the downstream dilution zone 5F of the extruder, where additional water 10 and/or other additives 11 are optionally fed into the extruder. Finally, the emulsified silicone polymer is removed from the extruder through line 12. The materials are moved through the extruder toward the drive 13 by the screws.

Figure 4:
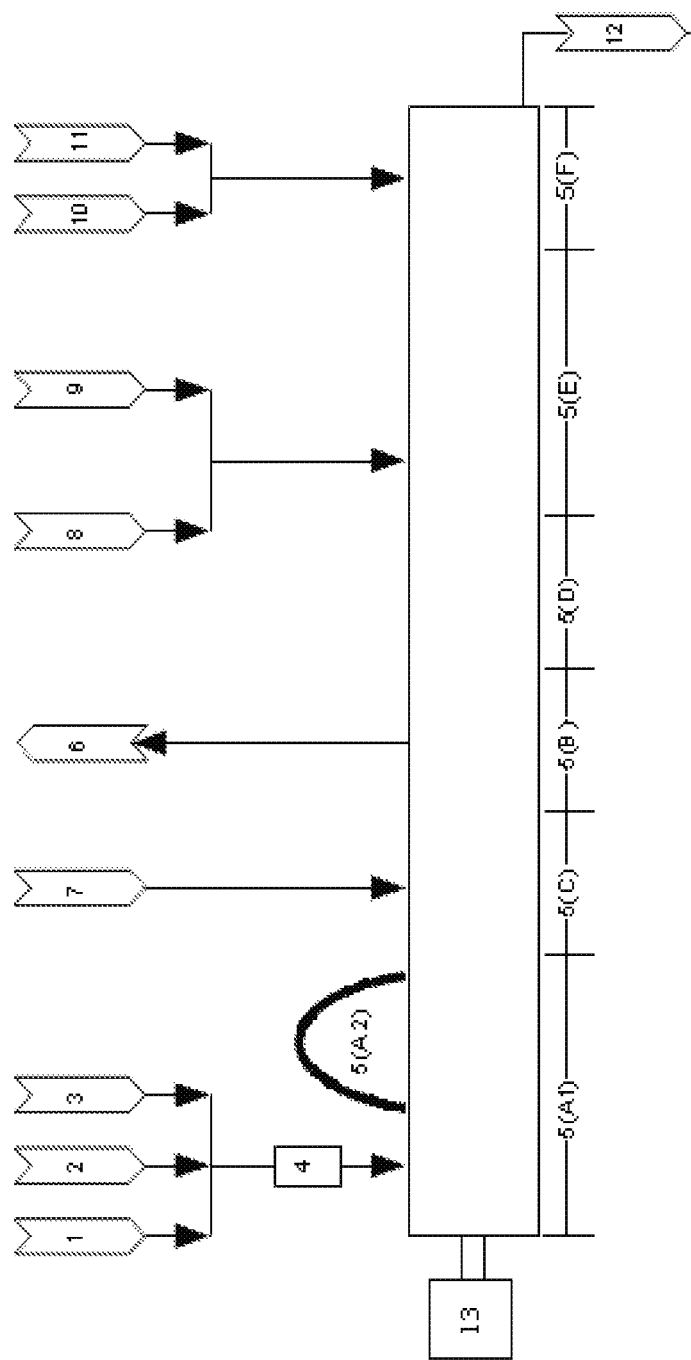
FIG. 4 illustrates an additional embodiment of an extruder used for the process described herein, wherein the stripping zone 5B follows the neutralization zone 5C.
Figure 5:
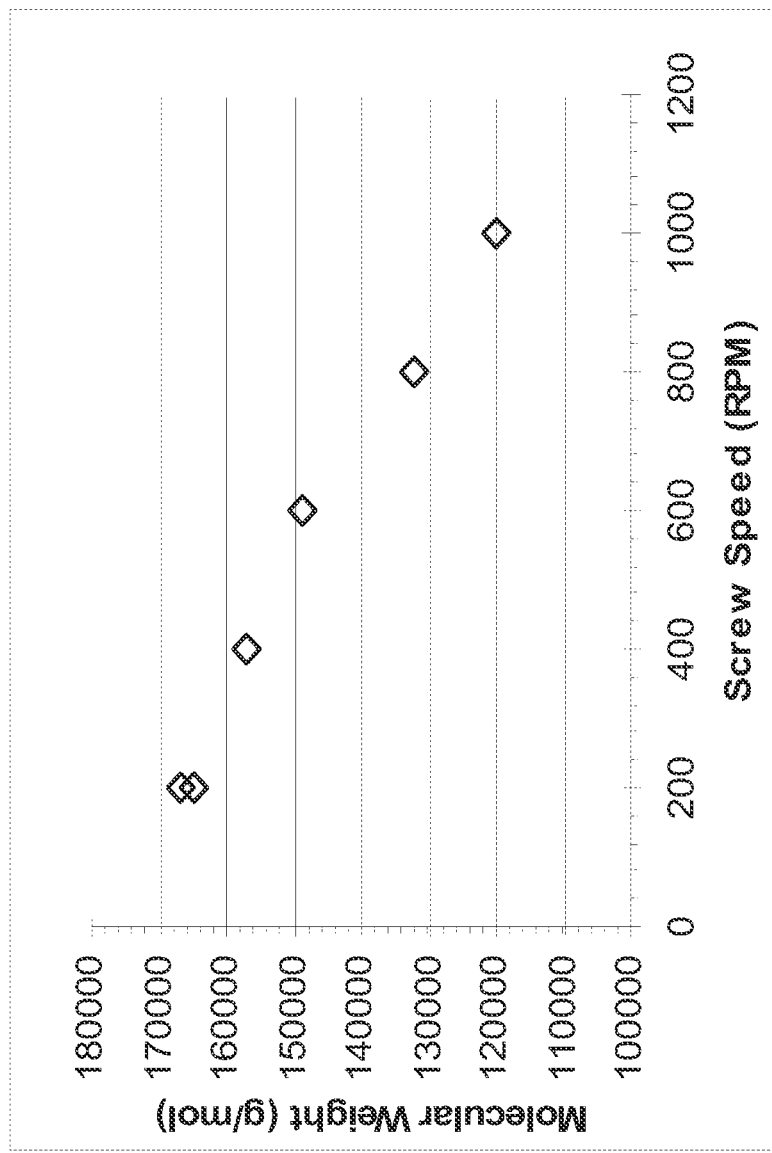
FIG. 5 shows an example of how some of the physical properties of the resulting emulsions (silicone polymer viscosity, emulsion particle size, content of low molecular weight contaminate) can be affected by the processing conditions. In a condensation reaction of linear polydimethylsiloxane polymer using a dodecylbenzylsulfonic acid surfactant-catalyst, the molecular weight of the silicone polymer is influenced by both the RPM of the screw and the screw design, both of which affect the mean residence time in the reaction zone.
Figure 6:
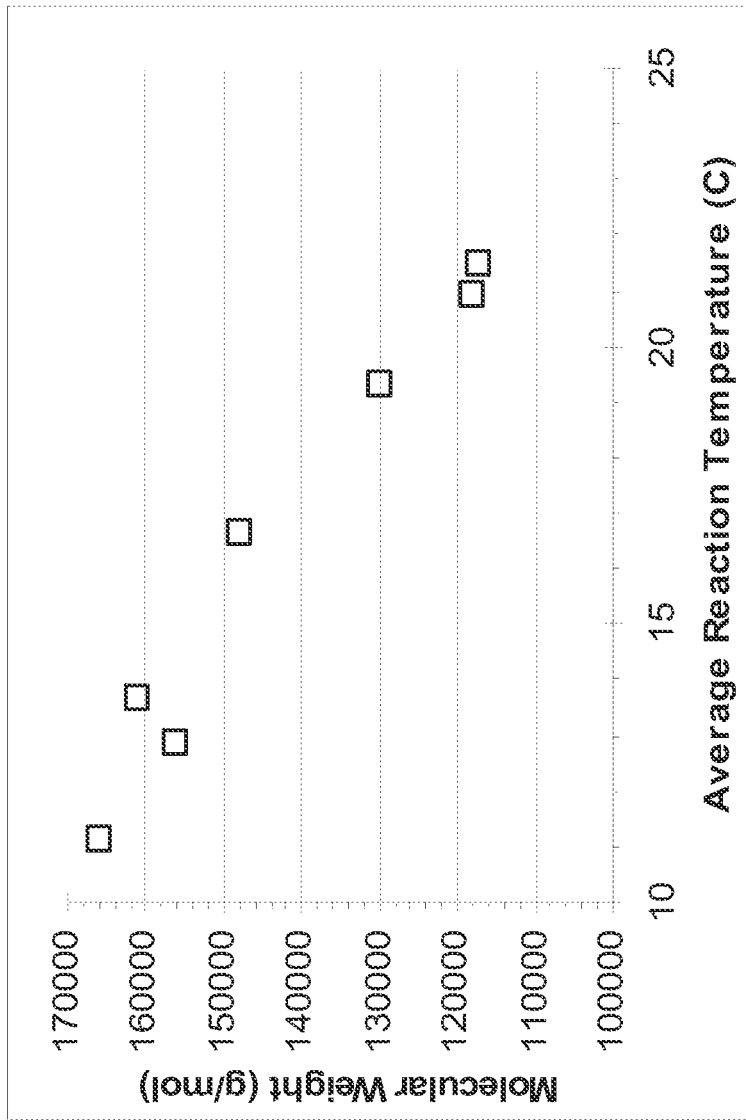
FIG. 6 also shows an example of how the resulting physical properties of the emulsions (silicone polymer viscosity, emulsion particle size, content of low molecular weight contaminate) can be affected by the processing conditions. In a condensation reaction of linear polydimethylsiloxane polymer using a dodecylbenzylsulfonic acid surfactant-catalyst, the molecular weight of the resultant polymer can be affected by the temperature at which the reaction occurs.
Figure 7:
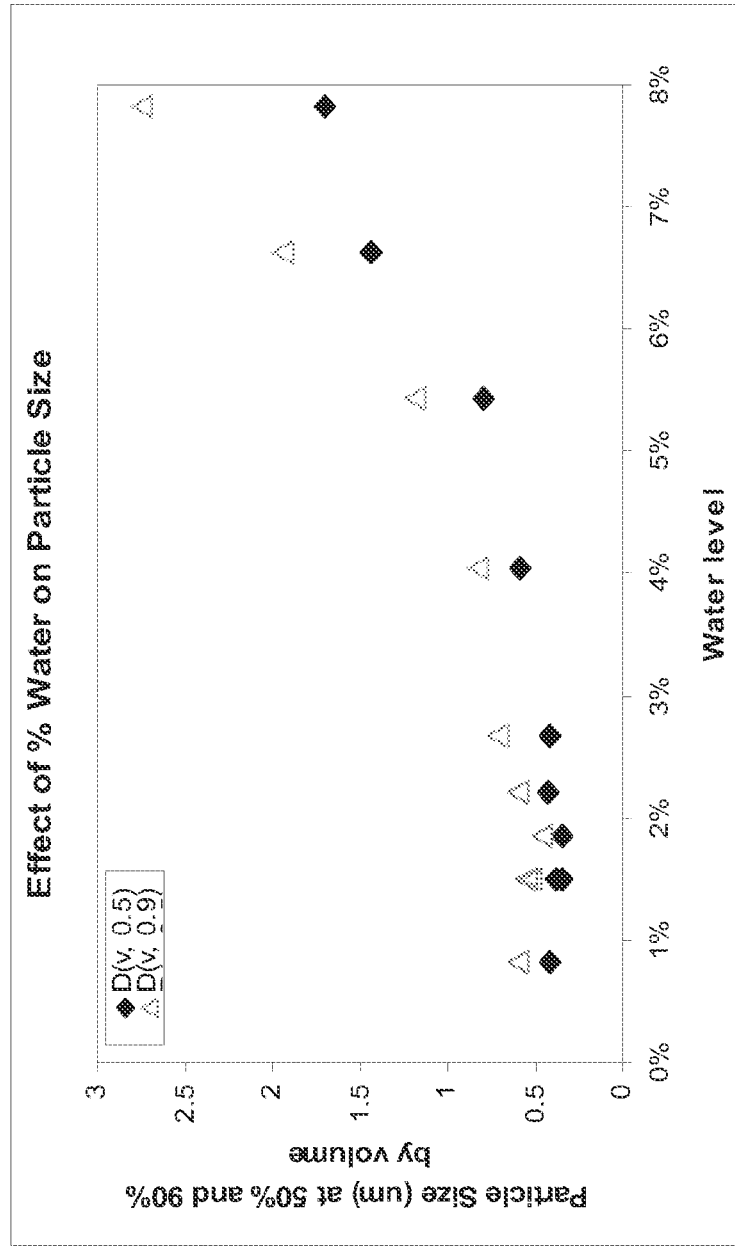
FIG. 7 illustrates how emulsion properties are affected by the ratio of raw materials introduced to the process, where under the same reaction conditions as mentioned in FIGS. 5-6, the mean particle size of the emulsion measured by light scattering technique is manipulated by varying the amount of water introduced to the extruder in the emulsification zone.
Figure 8:
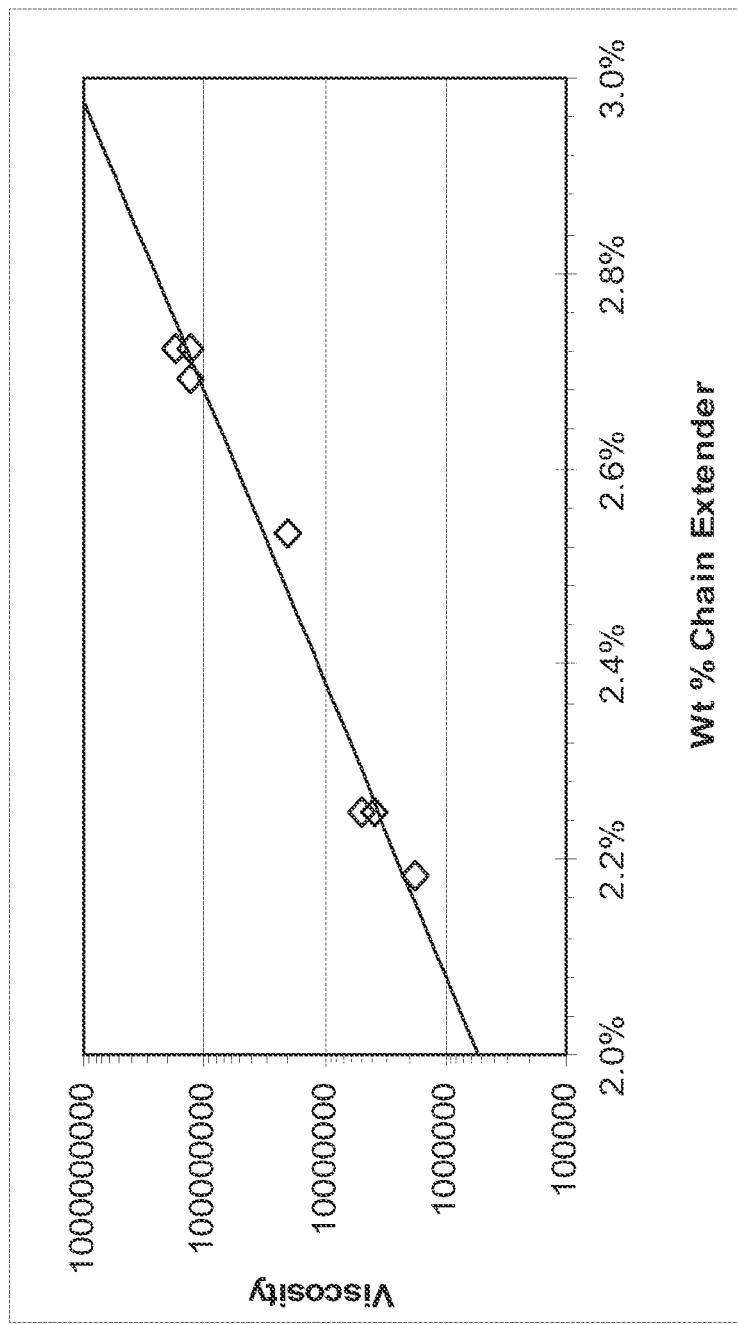
FIG. 8 illustrates the affect of the ratio of chain extender on the viscosity of the final silicone polymer for the addition reaction of a vinyl-terminal polydimethylsiloxane polymer and a hydrogen-terminal polydimethylsiloxane polymer, where the hydrogen-terminal polymer is acting as the chain extender.
Figure 9:
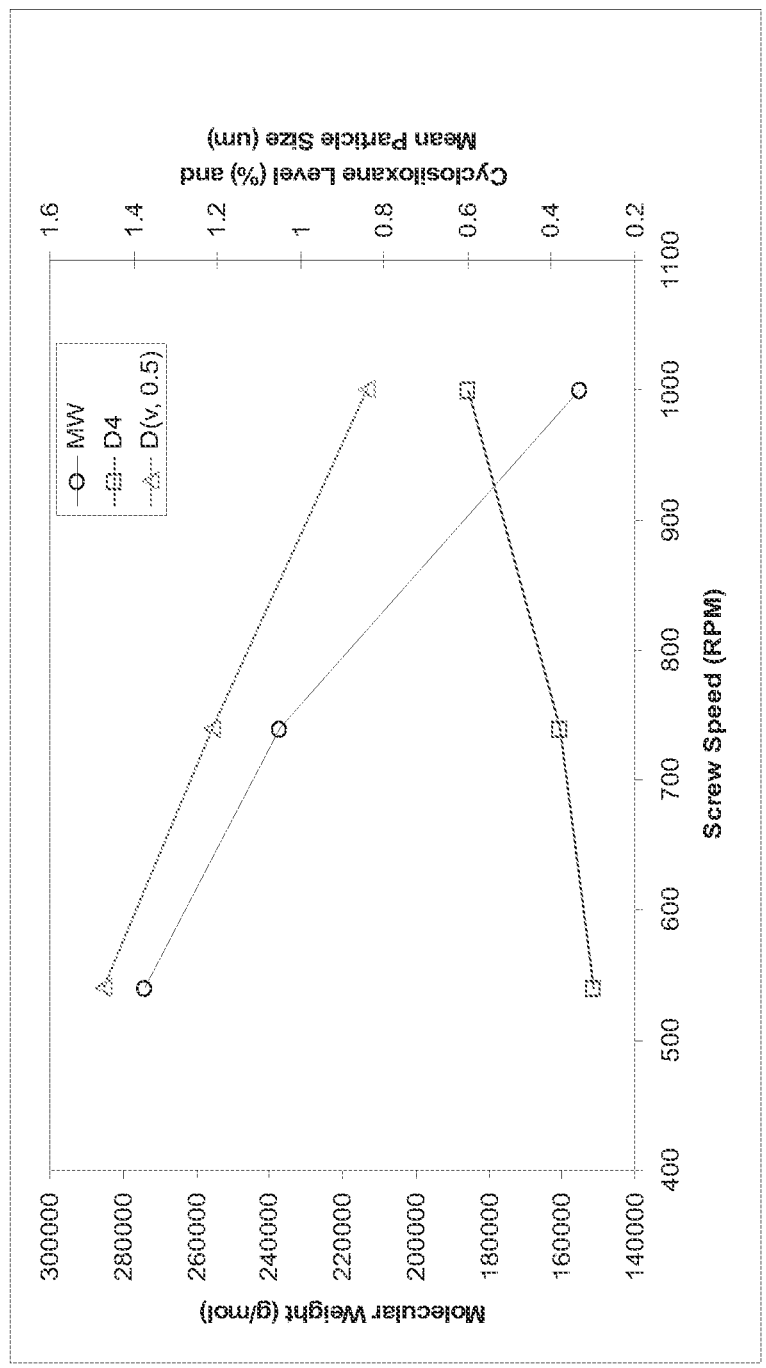
FIG. 9 shows that for a linear condensation reaction, some desirable properties such as high molecular weight of the resultant polymer and low levels of low molecular weight cyclosiloxane contamination may be optimized at low screw speeds but that these same process conditions may also have undesired effects on the mean emulsion particle size (assuming a smaller particle size is desired). This illustrates the unique nature of the process and apparatus described herein where conditions are optimized in a single process unit for both silicone polymer properties (molecular weight, contamination level) and emulsion properties (particle size).

FIG. 4 describes another extruder useful for the process. Connected to a twin screw extruder 5 are feed lines for continuously feeding starting materials 1 (polyorganosiloxanes), catalyst 2, and optional additives 3 (for example, end blocker or other conventional additives used in production of silicone polymer) respectfully through an optional static mixer 4 and then into the extruder reaction zone 5A, where a polymerization reaction occurs under controlled temperature and pressure.

The silicone polymer produced by the polymerization reaction moves from the reaction zone 5A to the downstream neutralization zone 5C of the extruder, where a neutralizing agent 7 is fed continuously into the extruder to stop the reaction mechanism.

The neutralized polymer moves from the neutralization zone 5C to the downstream stripping zone 5B of the extruder, where stripping can occur by subjecting the polymer to heat and/or reduced pressure whereby reaction byproducts 6 (for example, volatile siloxanes, unreacted cyclosiloxanes, or water) are removed from the silicone polymer. The removed materials may be condensed and collected.

The stripped silicone polymer moves from the stripping zone 5B to the downstream cooling zone 5D of the extruder, where the polymer is cooled prior to moving to the downstream emulsification zone 5E of the extruder, where one or more emulsifier(s) 8 and/or water 9 are optionally fed continuously into the extruder and emulsification takes place due to the shear imparted by the rotating screw(s) (not shown).

Once the desired emulsion is formed, it may optionally move from the emulsification zone 5E to the downstream dilution zone 5F of the extruder, where additional water 10 and/or other additives 11 are optionally fed into the extruder. Finally, the emulsified silicone polymer is removed from the extruder through line 12. The materials are moved through the extruder away from the drive 13 by the screws.

The extruder design enables polymerization, neutralization, stripping, and emulsification on a single apparatus. One of skill in the art will appreciate that the apparatus overcomes constraints relating to screw speeds for both polymerization and emulsification, throughput rate for both polymerization and emulsification, management of temperature, management of polyorganosiloxane starting materials, and management of high viscosity silicone polymer.

EXAMPLES

Embodiments will be better understood by reference to the following examples which are offered by way of illustration and which one of skill in the art will recognize are not meant to be limiting.

Example 1

Condensation Polymerization

An emulsion was made by feeding a hydroxy-terminated dimethyl siloxane (OH—[Si(Me)2O]$_x$—H; hydroxyl-terminated CAS Registry Number 70131-67-8; viscosity from about 55-90 cSt) at a rate of 335 g/min and alkylbenzenesulfonic acid at 29 g/min into a static mixer and then introduced into the extruder which was maintained at a temperature less than 20° C. The extruder used was a 25 mm co-rotating intermeshing Krupp Werner Pfleiderer twin screw extruder utilizing a variety of commercially available 1.55 ratio screw elements for distributive and dispersive mixing and heat transfer. The extruder was fitted with an external residence loop to allow for additional reaction time if necessary. After sufficient reaction time, 20 g/min of triethanolamine (99%) was fed into the extruder. The water generated from the reaction is sufficient enough to emulsify the polymer, creating a D(v, 0.5)=0.5 µm, D(v, 0.9)=0.6 µm emulsion. The internal phase was analyzed by GPC to show a Mz=250,000.

Example 2

Condensation Polymerization

An emulsion was made by feeding a hydroxy-terminated dimethyl siloxane (OH—[Si(Me)2O]$_x$—H; hydroxyl-terminated CAS Registry Number 70131-67-8; viscosity from about 55-90 cSt) at a rate of 182 g/min and phosphonitrilechloride ((PCl3=N—PCl2=N—PCl3+, PCl6-) catalyst (diluted 50:1 in dichloromethane) at 2.25 ml/min into the extruder. The mixture was heated to a temperature of 130° C. inside the extruder. The extruder was fitted with vent ports connected to a vacuum source of 28.5 inches Hg. 3.00 ml/min of neutralizer (trihexylamine diluted 50:1 in dichloromethane) was then added to the extruder to stop the reaction. After cooling to 30° C., two non-ionic aqueous surfactants [polyoxyethylene (4) lauryl ether and polyoxyethylene (23) lauryl ether] were added at rates of 5.3 and 3.4 grams per minute, causing the siloxane polymer to be emulsified, creating a 93% solid content emulsion of D(v, 0.5)=1.5 um, D(v, 0.9)=2.8 um. The internal phase was analyzed by GPC to show a Mz=274,000 and a viscosity of 1,031,000 mm$^2$/s. The octocyclotetrasiloxane content was measured to be 0.27 wt % in the resulting emulsion. The decacyclopentasiloxane content was measured to be 0.24 wt % in the emulsion.

Example 3

Condensation Polymerization

An emulsion was made by feeding a hydroxy-terminated dimethyl siloxane (OH—[Si(Me)2O]$_x$—H; hydroxyl-terminated CAS Registry Number 70131-67-8; viscosity from about 55-90 cSt) at a rate of 188 g/min and phosphonitrilechloride catalyst (diluted 50:1 in dichloromethane) at 2.25 ml/min into the extruder. The mixture was heated to a temperature of 130° C. inside the extruder. The extruder has been fitted with vent ports connected to a vacuum source of 28.5 inches Hg. 3.00 ml/min of neutralizer (trihexylamine diluted 50:1 in dodecylmethylcyclohexasiloxane) was then added to the extruder to stop the reaction. After cooling to 65° C., an additional amino-functional polysiloxane [dimethyl, methyl (aminoethylaminoisobutyl) siloxane] was added at a rate of 20 g/min and mixed into the polymer followed by the addition of two cationic aqueous surfactants [hexadecyltrimethylammonium chloride (for example, Arquad 16-29) and alkyl polyethylene glycol ethers (for example, Lutensol XP79)] and water at rates of 4.6, 3.2, and 8.4 g/min respectively, causing the siloxane polymer to be emulsified, creating a ~95% solid content emulsion of D(v, 0.5)=2.3 um, D(v, 0.9)=3.9 um. The internal phase was analyzed by GPC to show a Mz=270,000. The octocyclotetrasiloxane content was measured to be 0.28 wt % in the resulting emulsion. The decacyclopentasiloxane content was measured to be 0.23 wt % in the emulsion.

Example 4

Ring Opening Polymerization

An emulsion was made by feeding octamethylcyclotetrasilane at a rate of 250 g/min along with trimethylsiloxy-terminated dimethyl siloxane (viscosity of 50 Cst) at 0.1 g/min and polydimethylaminophosphazenium hydroxide catalyst at 0.1 g/min into a stream entering the reaction zone of the extruder at a temperature of 100° C. Trimethylsilyl vinylphosphonic acid neutralizer was fed at 0.1 g/min into the neutralization zone. Residuals from the reaction and any low volatile impurities are stripped in the devolatization zone. A nonionic surfactant [polyoxyethylene (23) lauryl ether] and water were mixed and introduced into the emulsification zone (surfactant at 20 g/min, water at 8.3 g/min). The particle size of the resulting emulsion was D(v, 0.5)=0.8 μm and D(v, 0.9)=1.1 μm. The internal phase of the Si polymer gum is measured as 38 mils plasticity. Plasticity was measured using a parallel plate Scott Tester, Inc. C544445 apparatus and a 4.2 g sample following ASTM D926 procedure.

Example 5

Addition Polymerization

An emulsion was made by feeding into an extruder maintained at a temperature of 100° C., a vinyl-terminated dimethyl siloxane ("CH$_2$=CH—[Si(Me)$_2$O]$_x$—Si(Me)$_2$—CH=CH$_2$" dimethylvinylsiloxy-terminated CAS Registry Number 68083-19-2; viscosity of from about 45,000-65,000 cS) at a rate of 350 g/min; hydrogen-terminated dimethyl siloxane (hydrogen-terminated CAS Registry Number 70900-21-9 which has 0.15%-0.21% SiH) at a rate of 8.4 g/min; and approximately 80 ppm of a dispersion of Karstedt platinum catalyst (CAS Registry Number 68478-92-2) in the same vinyl-terminated dimethyl siloxane used above, where the dispersion has an elemental Pt concentration of about 0.52 wt %. After sufficient reaction time, two non-ionic surfactants [polyoxyethylene (4) lauryl ether and polyoxyethylene (23) lauryl ether] were fed at rates of 13 and 23.3 g/min and water at a rate of 8.5 g/min was fed into the extruder, emulsifying the polymer, creating a D(v, 0.5)=0.55 um and D(v, 0.9)=0.96 μm emulsion.

The internal phase was analyzed to have a viscosity of 134,000,000 mm$^2$/s. The hydrogen-terminated dimethyl siloxane may be varied in the range of 1.9-2.4% of the vinyl terminated dimethyl siloxane to very the resultant polymer viscosity over the range of 1,856,000-175,000,000 mm$^2$/s. Water may be varied over the range of 2.5-5.0% of the total fed to the extruder to effect a change in mean emulsion particle size over the range of 0.4-1.4 μm (surfactant level held constant).

The present invention should not be considered limited to the specific examples described herein, but rather should be understood to cover all aspects of the invention. Various modifications and equivalent processes, as well as numerous structures and devices, to which the present invention may be applicable will be readily apparent to those of skill in the art. Those skilled in the art will understand that various changes may be made without departing from the scope of the invention, which is not to be considered limited to what is described in the specification.

What is claimed is:

1. A continuous process of making a silicone-in-water emulsion in an extruder, comprising:
   (i) forming a silicone polymer having a viscosity of at least 10,000 mm$^2$/s at 25° C. by polymerization of one or more polyorganosiloxanes in the extruder;
      wherein polymerization is selected from (a) condensation polymerization of at least one polyorganosiloxane having at least one hydroxyl group capable of undergoing condensation polymerization; (b) ring-opening polymerization of at least one cyclosiloxane; (c) addition polymerization of a mixture of at least one polyorganosiloxane having at least one unsaturated aliphatic group and at least one hydrogen-terminated polyorganosiloxane; and (d) combinations thereof;
      wherein one or more catalysts, optionally one or more endblockers, and optionally one or more other additives are mixed with the polyorganosiloxanes;
      wherein polymerization is carried out in the absence of solvent other than solvents used as carriers for the catalysts, optional endblockers, and optional additives;
   (ii) optionally, neutralizing or stripping the silicone polymer in the extruder, wherein stripping can occur before, after, or without addition of a neutralizing agent;
   (iii) cooling the silicone polymer in a cooling zone of the extruder at a temperature between about 0° C. and about 60° C.;
   (iv) optionally, mixing one or more emulsifiers with the silicone polymer in the extruder;
   (v) optionally, adding water to the silicone polymer in the extruder;
   (vi) applying shear to form a silicone-in-water emulsion in the extruder;

wherein the emulsion has a silicone polymer; wherein the emulsion has 0-0.3% by weight of at least one of octamethylcyclotetrasiloxanes and decamethylcyclopentasiloxanes; and (vii) optionally, diluting the emulsion in the extruder;
wherein the extruder is selected from single-screw extruders and multi-screw extruders.

2. The process of claim 1, wherein the silicone polymer is formed by condensation polymerization of at least one polyorganosiloxane having a viscosity of from about 40 mm²/s to about 100 mm²/s at 25° C.

3. The process of claim 2, wherein the polyorganosiloxanes are characterized by formula (1):

$$R^1O[R^2R^3SiO]_xH \qquad (1)$$

wherein $R^1$, $R^2$, and $R^3$ are independently selected from a hydrogen atom; an alkyl or substituted alkyl group containing up to 8 carbon atoms; an aryl or substituted aryl group containing up to 8 carbon atoms; and wherein x is an integer with a value of from 2-80.

4. The process of claim 3, wherein each $R^1$, $R^2$, and $R^3$ is independently selected from methyl, ethyl, propyl, isopropyl, butyl, sec-butyl, iso-butyl, and tert-butyl.

5. The process of claim 3, wherein the polyorganosiloxanes are polydimethylsiloxanes.

6. The process of claim 1, wherein the silicone polymer is formed by ring-opening polymerization of at least one cyclosiloxane having a viscosity of from about 1 mm²/s to about 5 mm²/s at 25° C.

7. The process of claim 6, wherein the cyclosiloxanes are characterized by formula (2):

$$[R^1R^2SiO]_x \qquad (2)$$

wherein $R^1$ and $R^2$ are independently selected from a hydrogen atom; an optionally substituted alkyl, alkenyl, aryl, alkaryl, or aralkyl group containing up to 8 carbon atoms; methyl; ethyl; n-propyl; trifluoropropyl; isopropyl; n-butyl; sec-butyl; iso-butyl; tert-butyl; vinyl; allyl; propenyl; butenyl; phenyl; tolyl; and benzoyl; and wherein x is an integer with a value of from 3 to 12.

8. The process of claim 7, wherein the cyclosiloxanes are selected from octamethylcyclotetrasiloxane, hexamethylcyclotrisiloxane, decamethylcyclopentasiloxane, cyclopenta(methylvinyl)siloxane, cyclotetra(phenylmethyl)siloxane, and cyclopentamethylhydrosiloxane.

9. The process of claim 1, wherein the silicone polymer is formed by addition polymerization of polyorganosiloxanes having a viscosity of from about 8 mm²/s to about 55,000 mm²/s at 25° C.

10. The process of claim 1, wherein the polyorganosiloxane is selected from linear polyorganosiloxanes or substantially linear polyorganosiloxanes.

11. The process of claim 10, wherein the polyorganosiloxanes are characterized by formula (3):

$$R^1O-[R^2R^3SiO]_xR^4 \qquad (3)$$

wherein $R^1$, $R^2$, $R^3$, and $R^4$ are independently selected from a hydrogen atom; an alkyl or substituted alkyl group containing up to 8 carbon atoms; an alkenyl or substituted alkenyl group containing up to 8 carbon atoms; an alkynyl or substituted alkynyl group containing up to 8 carbon atoms; an aryl or substituted aryl group containing up to 8 carbon atoms; substituted or unsubstituted vinyl; propenyl; butenyl; ethynyl; propynyl; and butyryl; and wherein x is an integer with a value of from 2 to 1300.

12. The process of claim 1, wherein the one or more catalysts is selected from phosphonitrile chloride, polydimethylaminophosphazenium hydroxide, and a platinum catalyst.

13. The process of claim 1, wherein the neutralization agent is selected from triethanolamine, trihexylamine, and trimethylsilyl vinylphosphonic acid.

14. The process of claim 1, wherein the silicone-in-water emulsion has an octamethylcyclotetrasiloxane content of from about 0% to about 0.3% by weight.

15. The process of claim 1, wherein the silicone-in-water emulsion has a decamethylcyclopentasiloxane content of from about 0% to about 0.3% by weight.

16. The process of claim 1, wherein the silicone-in-water emulsion comprises a silicone polymer having a viscosity of from about 10,000 mm²/s to about 200,000,000 mm²/s at 25° C.

17. The process of claim 16, wherein the silicone-in-water emulsion comprises a silicone polymer having a viscosity of from about 80,000 mm²/s to about 10,000,000 mm²/s at 25° C.

18. The process of claim 16, wherein the silicone-in-water emulsion comprises a silicone polymer having a viscosity of from about 1,200,000 mm²/s to about 175,000,000 mm²/s at 25° C.

19. The process of claim 1, wherein the silicone-in-water emulsion has an average particle size of from about 0.1 micrometers to about 25 micrometers.

20. The process of claim 1, wherein the silicone polymer is neutralized or stripped in the extruder.

21. The process of claim 1, wherein one or more emulsifiers are mixed with the silicone polymer in the extruder.

22. The process of claim 1, wherein water is added to the silicone polymer in the extruder.

* * * * *